United States Patent
Jung et al.

(10) Patent No.: US 12,418,425 B2
(45) Date of Patent: Sep. 16, 2025

(54) ELECTRONIC DEVICE AND ELECTRONIC DEVICE CONTROL METHOD

(71) Applicant: SAMSUNG ELECTRONICS CO., LTD., Suwon-si (KR)

(72) Inventors: Youngman Jung, Suwon-si (KR); Junbum Shin, Suwon-si (KR); Dongik Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 208 days.

(21) Appl. No.: 17/951,802

(22) Filed: Sep. 23, 2022

(65) Prior Publication Data

US 2023/0015612 A1   Jan. 19, 2023

Related U.S. Application Data

(63) Continuation of application No. PCT/KR2021/000896, filed on Jan. 22, 2021.

(30) Foreign Application Priority Data

Mar. 23, 2020 (KR) .................. 10-2020-0035285

(51) Int. Cl.
*H04W 12/06* (2021.01)
*H04B 17/318* (2015.01)
(Continued)

(52) U.S. Cl.
CPC .............. *H04L 9/40* (2022.05); *H04B 17/318* (2015.01); *H04L 63/0876* (2013.01)

(58) Field of Classification Search
CPC .............. H04L 63/0876; H04L 63/107; H04L 63/0492; H04L 9/40; H04B 17/318;
(Continued)

(56) References Cited

U.S. PATENT DOCUMENTS 8,792,826 B2   7/2014 Willis
9,980,127 B2   5/2018 Lee
(Continued)

FOREIGN PATENT DOCUMENTS

EP    3 594 913 A2    1/2020
JP    2019-175252 A   10/2019
(Continued)

OTHER PUBLICATIONS

International Search Report dated May 3, 2021 issued by the International Searching Authority in International Application No. PCT/KR2021/000896 (PCT/ISA/210).
(Continued)

*Primary Examiner* — Vu V Tran
(74) *Attorney, Agent, or Firm* — Sughrue Mion, PLLC

(57) ABSTRACT

An electronic device includes a memory storing instructions, and a processor configured to execute the instructions to, based on receiving one or more packets from an external device, identify whether the one or more packets are encrypted, acquire first information indicating whether each of the one or more packets is encrypted and second information indicating a received signal strength indicator (RSSI) of each of the one or more packets, and acquire authenticated RSSI information of the external device by identifying RSSI information of an encrypted first packet based on the first information and the second information.

20 Claims, 11 Drawing Sheets

(51) Int. Cl.
*H04L 9/40* (2022.01)
*H04W 4/80* (2018.01)
*H04W 12/08* (2021.01)
*H04W 12/10* (2021.01)
*H04W 12/63* (2021.01)
*H04W 12/79* (2021.01)

(58) Field of Classification Search
CPC ..... H04W 12/08; H04W 12/10; H04W 12/79; H04W 12/63; H04W 4/80
See application file for complete search history.

(56) References Cited

U.S. PATENT DOCUMENTS

| | | | |
|---|---|---|---|
| 10,039,145 | B2 | 7/2018 | Alipour et al. |
| 10,075,530 | B2 | 9/2018 | Park et al. |
| 10,249,122 | B1 | 4/2019 | Aksamít et al. |
| 10,645,559 | B2 | 5/2020 | Li et al. |
| 2011/0110521 | A1* | 5/2011 | Yang ............... H04W 48/20 709/222 |
| 2014/0136411 | A1 | 5/2014 | Cho et al. |
| 2014/0370917 | A1* | 12/2014 | Buchheim ............ H04W 4/023 455/456.1 |
| 2016/0100310 | A1 | 4/2016 | Lee |
| 2017/0063823 | A1* | 3/2017 | Cheng ................ H04W 12/08 |
| 2017/0150533 | A1* | 5/2017 | Alipour .............. H04W 76/10 |
| 2018/0352434 | A1* | 12/2018 | Ohtsu ............... H04L 63/0435 |

FOREIGN PATENT DOCUMENTS

| | | |
|---|---|---|
| KR | 10-0773944 B1 | 11/2007 |
| KR | 10-2012-0086428 A | 8/2012 |
| KR | 10-1455801 B1 | 11/2014 |
| KR | 10-1692993 B1 | 1/2017 |
| KR | 10-1928901 B1 | 12/2018 |

OTHER PUBLICATIONS

International Written Opinion dated May 3, 2021 issued by the International Searching Authority in International Application No. PCT/KR2021/000896 (PCT/ISA/237).
Communication dated Feb. 16, 2023, issued by European Patent Office in European Patent Application No. 21774863.1.
Communication dated Feb. 20, 2025 by the European Patent Office in European Application No. 25153656.1.
Communication issued on Sep. 4, 2024 by the European Patent Office in European Patent Application No. 21774863.1.
Communication issued on Sep. 11, 2024 by the Korean Intellectual Property Office in Korean Patent Application No. 10-2020-0035285.

* cited by examiner

ELECTRONIC DEVICE AND ELECTRONIC DEVICE CONTROL METHOD

CROSS-REFERENCE TO RELATED APPLICATION(S)

This application by-pass continuation of International Application No. PCT/KR2021/000896, filed on Jan. 22, 2021, in the Korean Intellectual Property Receiving Office, which is based on and claims priority to Korean Patent Application No. 10-2020-0035285, filed on Mar. 23, 2020, in the Korean Intellectual Property Office, the disclosures of which are incorporated by reference herein in their entireties

BACKGROUND

1. Field

The disclosure relates to an electronic device and a control method thereof, and more particularly, to an electronic device capable of acquiring a reliable received signal strength indicator (RSSI) and a control method thereof.

2. Description of Related Art

In recent years, short-distance wireless communication technology has been developed in which information is exchanged by connecting various devices (e.g., smartphones, personal computers (PCs) and earphones) with each other. In particular, Bluetooth technology has been widely introduced into a portable electronic device because of its easy pairing procedure, stable connectivity, etc.

Technology has been recently developed in which proximity authentication for an external device is performed based on whether an electronic device is connected to the external device through the Bluetooth or received signal strength indicator (RSSI) information of a packet received from the connected external device, and security or usability of the electronic device is improved based thereon.

For example, the related art includes technology for automatically unlocking the electronic device when a reliable external device is positioned close to the electronic device, and technology for automatically locking the electronic device when the reliable external device is moved away from the electronic device.

However, the RSSI information acquired according to the related art may have security vulnerabilities pointed out due to the RSSI information having no guaranteed integrity unlike data received through authentication/encryption, the RSSI information having no binding with the data received through authentication/encryption, and the RSSI information received from the external device having no guaranteed reliability because the external device has no guaranteed reliability in case that the external device's media access control (MAC) address is spoofed.

The related art also includes technology for increasing security by additionally checking the presence or absence of an encrypted connection in consideration of the fact that the connection between the electronic device and the external device alone may not guarantee the security. However, this technology may only be an indirect solution rather than a fundamental solution in that it is difficult to cover a scenario of every time point when a mutual switching of locking and unlocking is performed.

SUMMARY

Provided are an electronic device capable of acquiring a reliable RSSI and a control method thereof.

Additional aspects will be set forth in part in the description which follows and, in part, will be apparent from the description, or may be learned by practice of the presented embodiments.

According to an aspect of the disclosure, an electronic device may include a memory storing instructions, and a processor configured to execute the instructions to, based on receiving one or more packets from an external device, identify whether the one or more packets are encrypted, acquire first information indicating whether each of the one or more packets is encrypted and second information including an RSSI of each of the one or more packets, and acquire authenticated RSSI information of the external device by identifying RSSI information of an encrypted first packet based on the first information and the second information.

The processor may be further configured to execute the instructions to acquire third information indicating a reception time of each of the one or more packets, identify the one or more packets received from the external device for a predetermined period based on the third information, and identify the RSSI information of the encrypted first packet among the one or more packets identified as being received for the predetermined period based on the first information and the second information.

The predetermined period may be a period from a first time before a predetermined time interval to a second time, and the second time may be a time when the acquiring the authenticated RSSI information begins.

The processor may be further configured to execute the instructions to, based on the RSSI information of the encrypted first packet not being identified, transmit a request for performing encrypted communication to the external device, and, based on receiving an encrypted second packet from the external device, acquire RSSI information of a second packet.

The processor may be further configured to execute the instructions to terminate connection of the electronic device with the external device based on the second packet not being received from the external device.

The processor may be further configured to acquire information indicating a distance between the electronic device and the external device based on the RSSI information of the encrypted first packet or the RSSI information of the encrypted second packet, and perform proximity authentication for the external device based on the information indicating the distance between the electronic device and the external device.

The processor may be further configured to, based on identifying that the external device is positioned within a predetermined distance from the electronic device based on the information indicating the distance between the electronic device and the external device, unlock the electronic device, and, based on identifying that the external device is positioned beyond the predetermined distance from the electronic device based on the information indicating the distance between the electronic device and the external device, lock the electronic device.

According to an aspect of the disclosure, a control method for an electronic device may include, based on receiving one or more packets from an external device, identifying whether the one or more packets are encrypted, acquiring first information indicating whether each of the one or more packets is encrypted and second information including an RSSI of each of the one or more packets, and acquiring authenticated RSSI information of the external device by identifying RSSI information of an encrypted first packet based on the first information and the second information.

The method may further include acquiring third information indicating reception time of each of the one or more packets, where the RSSI information of the encrypted first packet is identified by identifying the one or more packets received from the external device for a predetermined period based on the third information, and identifying the RSSI information of the encrypted first packet among the one or more packets identified as being received for the predetermined period based on the first information and the second information.

The predetermined period may be a period from a first time before a predetermined time interval to second time, and the second time may be a time when the acquiring the authenticated RSSI information begins.

The method may further include, based on the RSSI information of the encrypted first packet not being identified, transmitting a request for performing encrypted communication to the external device, and, based on receiving an encrypted second packet from the external device, acquiring RSSI information of a second packet.

The method may further include terminating connection of the electronic device with the external device based on the second packet not being received from the external device.

The method may further include acquiring information indicating a distance between the electronic device and the external device based on the RSSI information of the encrypted first packet or the RSSI information of the encrypted second packet, and performing proximity authentication for the external device based on the information indicating the distance between the electronic device and the external device.

The method may further include, based on identifying that the external device is positioned within a predetermined distance from the electronic device based on the information indicating the distance between the electronic device and the external device, unlocking the electronic device, and, based on identifying that the external device is positioned beyond the predetermined distance from the electronic device based on the information indicating the distance between the electronic device and the external device, locking the electronic device.

According to an aspect of the disclosure, a non-transitory computer-readable recording medium may store instructions that, when executed by at least one processor of an electronic device, cause the at least one processor to, based on receiving one or more packets from an external device, identify whether the one or more packets are encrypted, acquire first information indicating whether each of the one or more packets is encrypted and second information including a received signal strength indicator (RSSI) of each of the one or more packets, and acquire authenticated RSSI information of the external device by identifying RSSI information of an encrypted first packet based on the first information and the second information.

The instructions, when executed, may further cause the at least one processor to acquire third information indicating a reception time of each of the one or more packets, identify the one or more packets received from the external device for a predetermined period based on the third information, and identify the RSSI information of the encrypted first packet among the one or more packets identified as being received for the predetermined period based on the first information and the second information.

The predetermined period may be a period from a first time before a predetermined time interval to second time, and the second time may be a time when the acquiring the authenticated RSSI information begins.

The instructions, when executed, may further cause the at least one processor to, based on the RSSI information of the encrypted first packet not being identified, transmit a request for performing encrypted communication to the external device, and based on receiving an encrypted second packet from the external device, acquire RSSI information of a second packet.

The instructions, when executed, may further cause the at least one processor to terminate connection of the electronic device with the external device based on the second packet not being received from the external device.

The instructions, when executed, may further cause the at least one processor to acquire information indicating a distance between the electronic device and the external device based on the RSSI information of the encrypted first packet or the RSSI information of the encrypted second packet, and perform proximity authentication for the external device based on the information indicating the distance between the electronic device and the external device.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
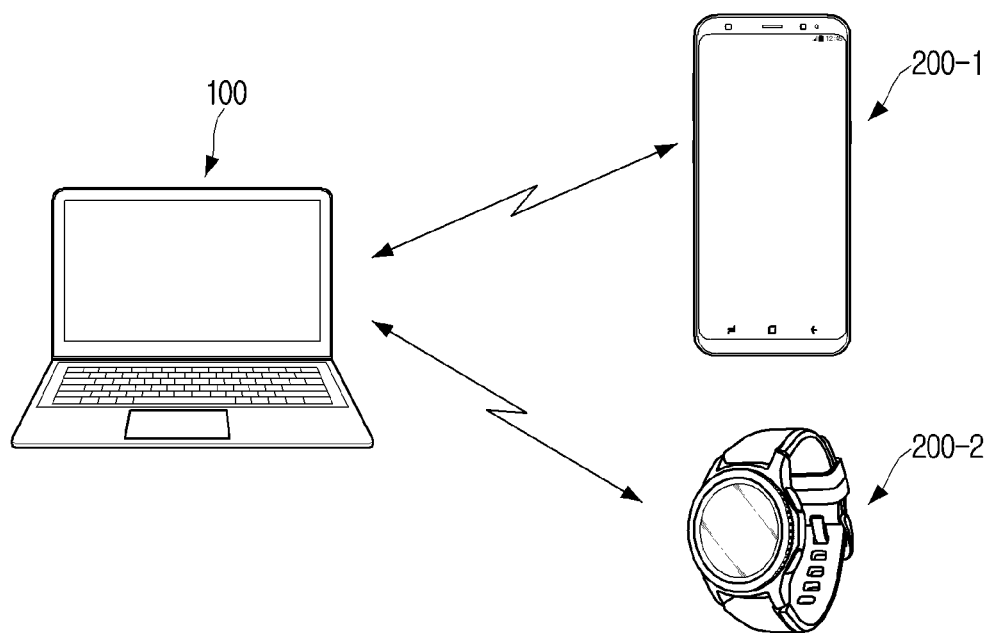
FIG. 1 is a diagram of a communication connection between an electronic device and an external device according to an embodiment of the disclosure.

The present disclosure may be variously modified and have several embodiments, and the specific embodiments of the present disclosure are thus shown in the drawings and described in detail in the detailed description. However, it is to be understood that technologies mentioned in the present disclosure are not limited to the specific embodiments, and include various modifications, equivalents, and/or alternatives according to the embodiments of the present disclosure. Throughout the accompanying drawings, similar components are denoted by similar reference numerals.

In addition, the following embodiments may be modified in several different forms, and the scope and spirit of the present disclosure are not limited to the following embodiments. Rather, these embodiments are provided to make the present disclosure thorough and complete, and to completely transfer the spirit of the present disclosure to those skilled in the art.

Terms used in the present disclosure are used only to describe the specific embodiments rather than limiting the scope of the present disclosure. Terms of a singular form may include plural forms unless explicitly indicated otherwise.

In the present disclosure, the expression "have," "may have," "include," "may include" or the like, indicates existence of a corresponding feature (for example, a numerical value, a function, an operation or a component such as a part), and does not exclude existence of an additional feature.

In the present disclosure, the expression "A or B," "least one of A and/or B" or "one or more of A and/or B" may include all possible combinations of items enumerated together. For example, "A or B," "at least one of A and B," or "at least one of A or B" may indicate all of 1) a case where only A is included, 2) a case where only B is included, or 3) a case where both of A and B are included.

The expressions "first," "second" and the like, used in the present disclosure may indicate various components regardless of a sequence and/or importance of the components. These expressions are only used in order to distinguish one component from the other components, and do not limit the corresponding components.

In case that any component (for example, a first component) is mentioned to be "(operatively or communicatively) coupled with/to" or "connected to" another component (for example, a second component), it is to be understood that the any component is directly coupled to the another component or may be coupled to the another component through other component (for example, a third component).

On the other hand, in case that any component (for example, the first component) is mentioned to be "directly coupled" or "directly connected to" another component (for example, the second component), it is to be understood that the other component (for example, the third component) is not present between any component and another component.

An expression "configured (or set) to" used in the present disclosure may be replaced by an expression "suitable for," "having the capacity to," "designed to," "adapted to," "made to" or "capable of" based on a situation. A term "configured (or set) to" may not necessarily indicate "specifically designed to" in hardware.

Instead, an expression "an apparatus configured to" may indicate that the apparatus may "perform~" together with other apparatuses or components. For example, "a processor configured (or set) to perform A, B, and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In the embodiments, a "module" or a "—er/or" may perform at least one function or operation, and be implemented by hardware or software or be implemented by a combination of hardware and software. In addition, a plurality of "modules" or a plurality of "—ers/ors" may be integrated in at least one module and be implemented by at least one processor except for a "module" or an "—er/or" that needs to be implemented by specific hardware.

Various elements and regions in the drawings are schematically illustrated. Therefore, the spirit of the present disclosure is not limited by relative sizes or intervals shown in the accompanying drawings.

An electronic device and an external device according to various embodiments of the present disclosure may include, for example, at least one of a smartphone, a tablet personal computer (PC), a desktop PC, a laptop PC or a wearable device. The wearable device may include at least one of an accessory type wearable device (for example, a watch, a ring, a bracelet, an anklet, a necklace, a glasses, a contact lens, or a head-mounted-device (HMD), a textile or clothing integral type wearable device (for example, an electronic clothing), a body attachment type wearable device (for example, a skin pad or a tattoo), or a living body implantation type circuit.

In some embodiments, the electronic device may include, for example, at least one of a television, a digital video disk (DVD) player, an audio player, a refrigerator, an air conditioner, a vacuum cleaner, an oven, a microwave oven, a washing machine, an air purifier, a set-top box, a home automation control panel, a security control panel, a media box (e.g., Samsung HomeSync™, Apple TV™ or Google TV™), a game console (e.g., Xbox™ or PlayStation™), an electronic dictionary, an electronic key, a camcorder or an electronic picture frame.

In another embodiment, the electronic device may include at least one of various medical devices (e.g., various portable medical devices (such as a blood glucose monitor, a heart rate monitor, a blood pressure monitor or a body temperature monitor), a magnetic resonance angiography (MRA), a magnetic resonance imaging (MRI), a computed tomography (CT), a camera or a ultrasonicator), a navigation device, a global positioning system (i.e., global navigation satellite system (GNSS)), an event data recorder (EDR), a flight data recorder (FDR), an automotive infotainment device, marine electronic equipment (e.g., a marine navigation system or a gyro compass), an avionics, a security device, a vehicle head unit, an industrial or home robot, a drone, an automated teller machine (ATM) in a financial institution, a point of sales (POS) in a store or an internet of things device (e.g., a light bulb, various sensors, a sprinkler device, a fire alarm, a thermostat, a street light, a toaster, fitness equipment, a hot water tank, a heater or a boiler).

Hereinafter, embodiments of the present disclosure will be described in detail with reference to the accompanying drawings so that those skilled in the art to which the present disclosure pertains may easily practice the present disclosure.

Figure 2:
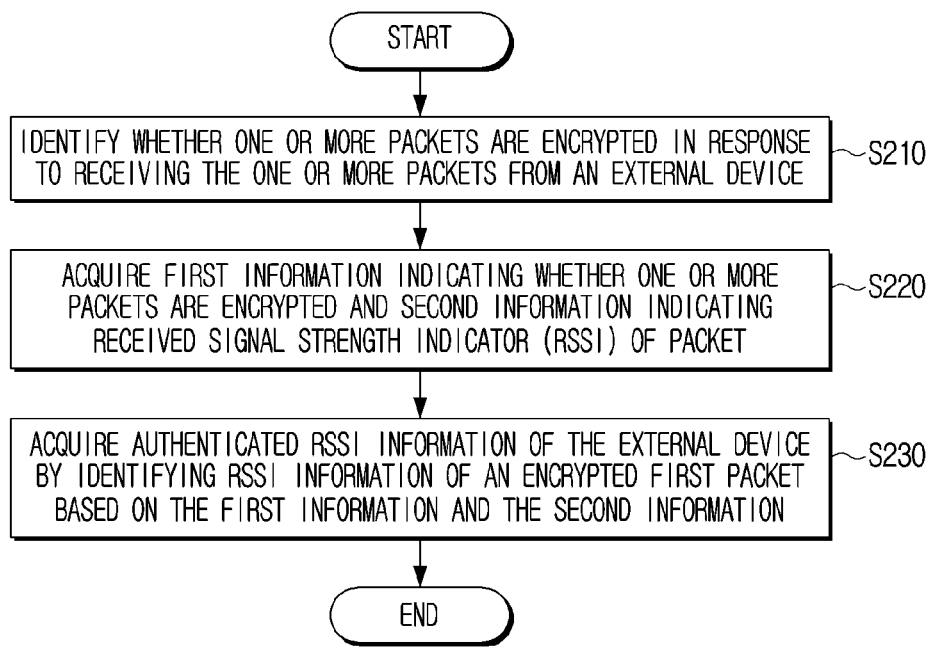
FIG. 2 is a flowchart of an example of a control method for an electronic device according to an embodiment of the disclosure.

FIG. 1 is a diagram of communication connection between an electronic device 100 and an external device 200 according to an embodiment of the disclosure. FIG. 2 is a flowchart of an example of a control method for an electronic device 100 according to an embodiment of the disclosure. Hereinafter, embodiments of the present disclosure are described with reference to FIGS. 1 and 2.

As shown in FIG. 1, the electronic device 100 according to the present disclosure may be connected to external devices 200-1 and 200-2. In particular, the electronic device 100 may be connected to the external devices 200-1 and 200-2 through a Bluetooth communication method. Bluetooth refers to one of the standards that define a short-distance wireless communication method between the devices (i.e., electronic device 100 according to the present disclosure or external devices 200-1 and 200-2). The Bluetooth standard may be distinguished into versions such as basic rate/enhanced data rate (BR/EDR), high speed (HS) and Bluetooth low energy (BLE) versions. Hereinafter, the present disclosure is described on a premise that the electronic device 100 is connected to the external devices 200-1 and 200-2 through the Bluetooth communication method. However, the present disclosure is not limited to the Bluetooth communication method, and is not limited to following a specific version of the Bluetooth standard.

For example, the electronic device 100 according to the present disclosure may be implemented as a laptop computer, and the external device 200-1 or 200-2 may be implemented as a smartphone or a smart watch. However, the present disclosure is not limited thereto. That is, in case that a device may perform a function of a master device or a slave device in Bluetooth communication connection, the device may be the electronic device 100 or the external device 200-1 or 200-2 according to the present disclosure. As shown in FIG. 1, the electronic device 100 may be connected to the plurality of external devices 200-1 and 200-2 to perform the communication. However, hereinafter, one external device 200 is specifically described for convenience of description.

When the electronic device 100 and the external device 200 are connected with each other, the electronic device 100 may receive one or more packets from the external device 200. The electronic device 100 may also transmit the one or more packets to the external device 200. In describing the present disclosure, the term "packet" is used as a general term for a unit of information exchanged between the electronic device 100 and the external device 200. Accordingly, the term "packet" may be interpreted to include the meaning of data, message, signal or the like.

Hereinafter, another embodiment of the present disclosure is described with reference to FIG. 2. First, in operation S210, an electronic device 100 may identify whether received one or more packets are encrypted in response to receiving the one or more packets from an external device 200. In operation S220, the electronic device 100 may then acquire first information indicating whether each of the received one or more packets are encrypted and second information including a received signal strength indicator (RSSI) of each of the received one or more packets and store the information in a memory.

In detail, the electronic device 100 may acquire the first information by identifying whether each of the received one or more packets are encrypted. In addition, the electronic device 100 may acquire the second information by measuring the RSSI of each of the received one or more packets. In addition, the electronic device 100 may correlate the first and second information corresponding to each packet with each other and then store the information in the memory of the electronic device 100. The electronic device 100 may identify the external device 200 that transmits one or more packets based on identification information of the external device 200 such as a media access control address (MAC) address, and manage the first information and the second information for each external device 200.

In particular, a process of acquiring the first information by identifying whether each of the received packet is encrypted, and a process of acquiring the second information indicating the RSSI of the received packet may be performed through a Bluetooth controller (hereinafter referred to as a controller). The process of acquiring the first information and the second information under Bluetooth architecture is described in more detail with reference to FIG. 8.

In operation S230, the electronic device 100 may acquire authenticated RSSI information of the external device 200 by identifying RSSI information of an encrypted first packet based on the first information and the second information. In detail, the electronic device 100 may identify the encrypted first packet among the received one or more packets based on the first information stored in the memory, and identify the RSSI information corresponding to the first packet based on the second information stored in the memory when the instruction for acquiring the authenticated RSSI information of the external device 200 is executed. In describing the present disclosure, the term "first packet" is used for specifying any encrypted packet among the one or more packets received from the external device 200 before the instruction for acquiring the authenticated RSSI information is executed.

In particular, the instruction for acquiring the authenticated RSSI information of the external device 200 may be implemented by a host controller interface (HCI) function (or method) in which a Bluetooth host (hereinafter referred to as a host) requests RSSI information of an encrypted packet from the controller. In detail, the controller may identify the RSSI information of the encrypted first packet based on the first information and the second information as described above when the host requests the RSSI information of the encrypted packet from the controller, and then transmit the identified information to the host. A process of identifying the RSSI information of the encrypted first packet based on the first information and the second information under the Bluetooth architecture is described in more detail with reference to FIG. 8.

The electronic device 100 may perform various operations based on the RSSI information of the first packet when the RSSI information of the first packet is identified as described above. In particular, the electronic device 100 may perform authentication for the external device 200 based on the identified RSSI information of the first packet. That is, the identified RSSI information of the first packet as described above may be acquired through the encrypted packet, and thus be referred to as reliable RSSI information of a packet received from a reliable device. Hereinafter, in describing the present disclosure, such RSSI information is referred to as "authenticated RSSI information."

In detail, the electronic device 100 may acquire information indicating a distance between the electronic device 100 and the external device 200 based on the RSSI information of the first packet. That is, the electronic device 100 may acquire the information indicating the distance between the electronic device 100 and the external device 200 by using a principle that a strength of a signal transmitted from the external device 200 has a decreased strength and then received by the electronic device 100 as the distance between the electronic device 100 and the external device 200 is increased when the RSSI information of the first packet is acquired, and perform proximity authentication for the external device 200. Specific processes of acquiring the information indicating the distance between the electronic device 100 and the external device 200 and performing the proximity authentication for the external device 200 are described in more detail with reference to FIG. 9.

According to another embodiment of the present disclosure as described above, the electronic device 100 may store the RSSI information of the encrypted packet among the packets received from the external device 200 as the authenticated RSSI information, and perform the proximity authentication for the external device 200 based on the authenticated RSSI information when the authenticated RSSI information is required, thereby improving security of the proximity authentication for the external device 200.

Hereinafter, another embodiment of the present disclosure is described with reference to FIGS. 2 and 3.

Figure 3:
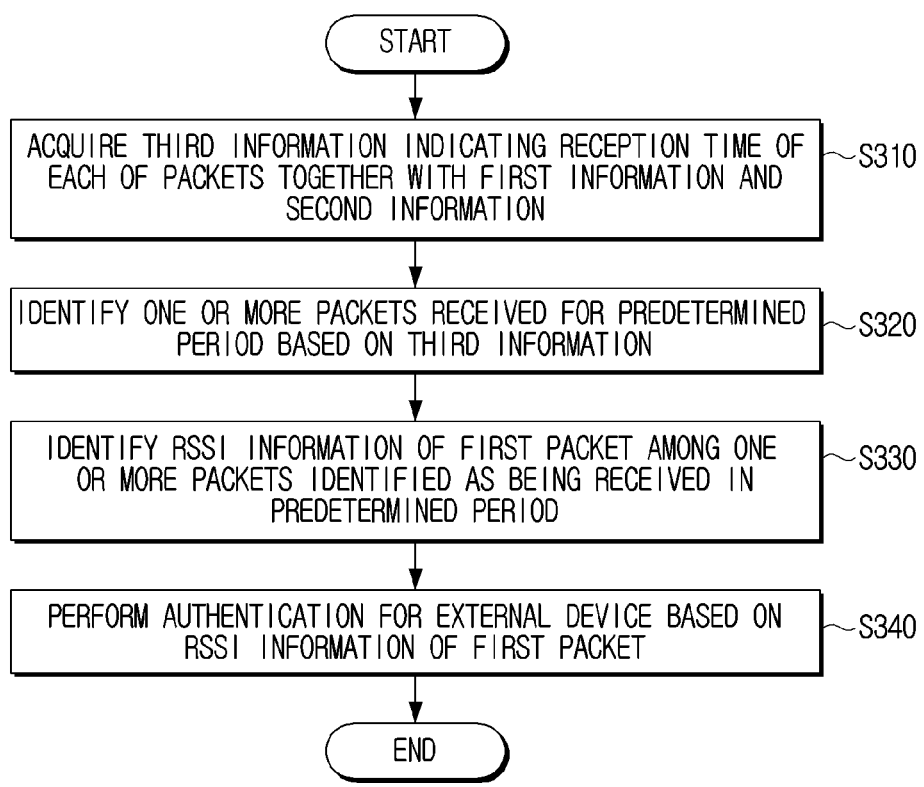
FIG. 3 is a flowchart of an example of a control method for an electronic device according to an embodiment of the disclosure.

FIG. 3 is a flowchart of an example of the control method for an electronic device 100 according to an embodiment of the disclosure.

The description provided with reference to FIG. 2 does not consider a case where position of at least one of the electronic device 100 or the external device 200 is changed. However, the position of at least one of the electronic device 100 or the external device 200 may be changed. Accordingly, it may be impossible to guarantee the reliability of the RSSI information of a packet received before a considerable period of time based on time when the instruction for acquiring the authenticated RSSI information is executed. Accordingly, as described in detail below with reference to FIG. 3, the electronic device 100 may additionally consider information indicating the time when the packet is received in acquiring the authenticated RSSI information.

In detail, referring to FIG. 3, in operation S310, the electronic device 100 according to the present disclosure may acquire third information indicating the reception time of each of the received one or more packets together with the first information and the second information as described above. That is, as described with reference to FIG. 1, the electronic device 100 may acquire the first information indicating whether the packet is encrypted and the second information including the RSSI and store the information in the memory, as well as acquire the third information indicating the reception time of each packet, correlate the third information corresponding to each packet with the first information and the second information, and store the same in the memory.

In operation S320, the electronic device 100 may identify the one or more packets received from the external device 200 in a predetermined period based on the third information. Operation S320 may be performed when the instruction for acquiring the authenticated RSSI information of the external device 200 is executed.

Here, the "predetermined period" may refer to a period from a first time to a second time, and the second time may refer to a time when the instruction for acquiring the authenticated RSSI information is executed, and the first time may refer to a time before a predetermined time interval. In other words, the second time may refer to the time when the instruction for acquiring the authenticated RSSI information is executed or a time when the acquiring the authenticated RSSI information begins, and the first time may refer to a time before the predetermined period. In this case, the electronic device 100 may identify the one or more packets received from the first time to the second time, and may identify the encrypted first packet and the RSSI information of the first packet among the packets.

The predetermined period may be changed by being set of the developer or user of the electronic device 100.

In operation S330, the electronic device 100 may identify the RSSI information of the first packet among the one or more packets in the predetermined period. In other words, the electronic device 100 may target only the one or more packets received from the external device 200 in the predetermined period to identify the encrypted first packet based on the first information, and identify the RSSI information of the first packet based on the second information.

In operation S340, the electronic device 100 may perform the authentication for the external device 200 based on the RSSI information of the first packet when the RSSI information of the first packet is identified. A description thereof is not different from the description provided with reference to FIG. 1, and a redundant description is thus omitted.

The third information indicating the reception time of each packet may be used together with the second information including the RSSI of each packet to acquire information indicating a change in the distance between the electronic device 100 and the external device 200 or a change in the position of the electronic device 100 or the external device 200.

According to another embodiment of the present disclosure as described above, the electronic device 100 may perform the proximity authentication for the external device 200 in consideration of only the reliable RSSI information of the packet received within a period to guarantee the reliability, and may thus perform the high-security proximity authentication even when the position of at least one of the electronic device 100 and the external device 200 is changed.

Figure 4:
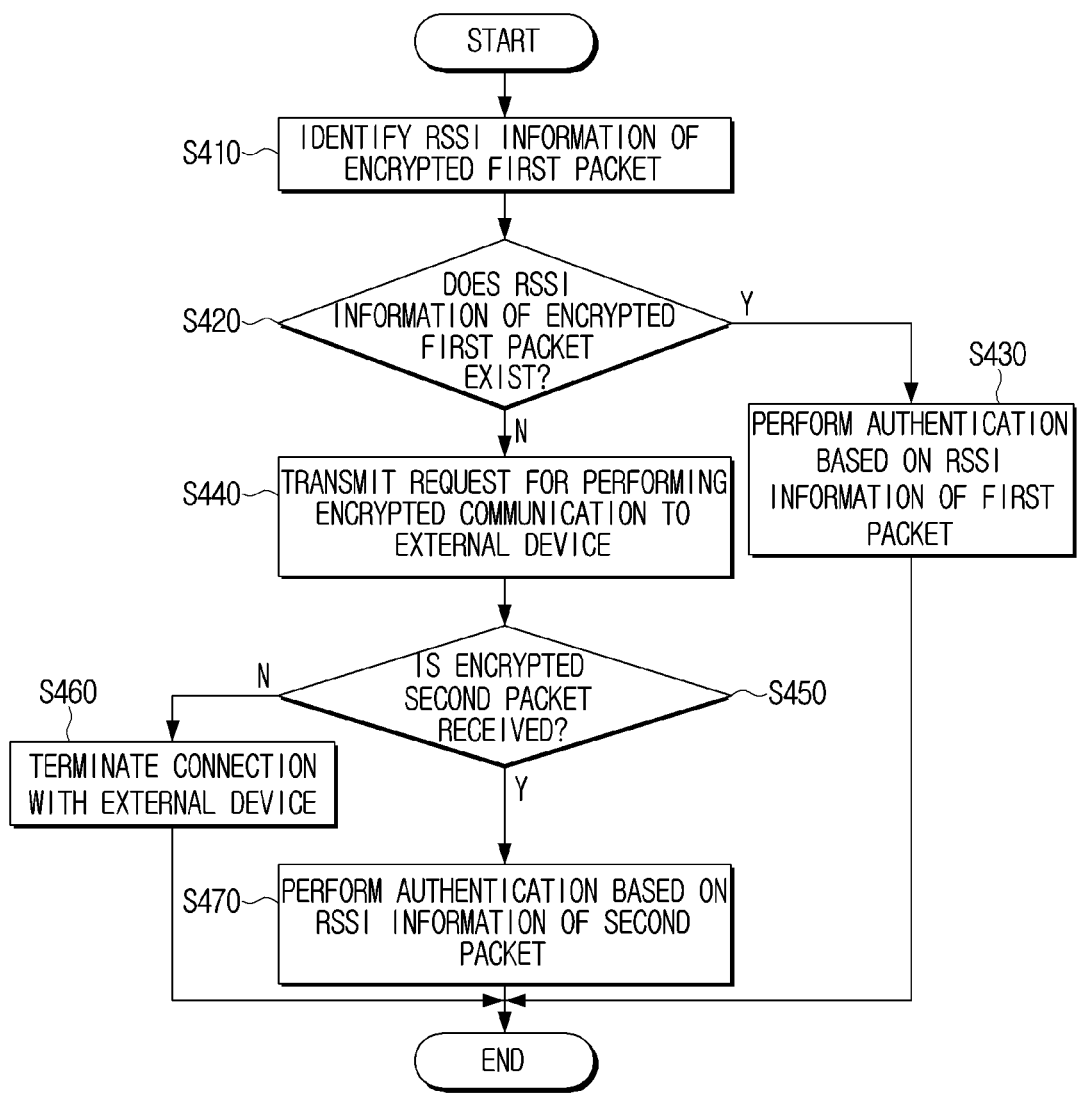
FIG. 4 is a flowchart of an example of a control method for an electronic device according to an embodiment of the disclosure.

FIG. 4 is a flowchart of an example of the control method for an electronic device 100 according to an embodiment of the disclosure.

Hereinafter, with reference to FIG. 4, a method for acquiring the authenticated RSSI information according to the present disclosure is described in detail when it is identified that the RSSI information of the encrypted first packet does not exist. The description provided with reference with FIG. 4 mainly describes an embodiment in which the authentication for the external device 200 is performed based on the authenticated RSSI information. However, as described above, the authenticated RSSI information acquired according to the present disclosure is not necessarily available only for the authentication for the external device 200.

In detail, in operation S410, the electronic device 100 according to the present disclosure may identify the RSSI information of the encrypted first packet. Operation S410 may be performed when the instruction for acquiring the authenticated RSSI information is executed. In detail, the electronic device 100 may identify the RSSI information of the encrypted first packet based on the first information and the second information stored (or pre-stored) in the memory. In addition, as described with reference to FIG. 2, the electronic device 100 may also identify the RSSI information of the encrypted first packet among the received one or more packets in the predetermined period based on the first information, the second information and the third information.

In operation S420, the electronic device 100 may determine whether RSSI information of the encrypted first packet exists.

In operation S430, the electronic device 100 may perform the authentication for the external device 200 based on the RSSI information of the first packet when it is identified that the RSSI information of the first packet exists as a result of the identification (S420—Y). The embodiments according to FIGS. 1 and 2 are described above on the assumption that the RSSI information of the encrypted first packet is identified. However, on the other hand, as a result of the identification, it may be identified that the RSSI information of the first packet among the one or more packets received from the external device 200 does not exist.

As mentioned above, the term "first packet" may be used for specifying any encrypted packet among the one or more packets received from the external device 200 before the instruction for acquiring the authenticated RSSI information is executed. Therefore, the identification result that the RSSI information of the first packet does not exist may indicate that the encrypted packet does not exist among the one or more packets received from the external device (or among the one or more packets received from the external device for the predetermined period), and thus indicate a state where it is impossible to acquire the authenticated RSSI information according to the present disclosure without an additional operation. Hereinafter, each step of the method for acquiring the authenticated RSSI information in such a case is described in detail.

In operation S440, the electronic device 100 may transmit a request for performing encrypted communication to the external device 200 when it is identified that the RSSI information of the first packet does not exist as the result of the identification (S420-N).

Here, the "encrypted communication" may be used as a generic term for communication enabling an encrypted packet to be received through a secure connection. In detail, it may be determined whether the packet is received through the secure connection or through an insecure connection depending on a type of service to be used after a link is established between the electronic device 100 and the external device 200 through a Bluetooth communication method.

For example, the electronic device 100 may be connected to the external device 200 through the BR or EDR version of the Bluetooth communication method. In this case, the packet may be received through the insecure connection when the service to be used uses a protocol of the host such as a service discovery protocol (SDP), and accordingly, the encrypted communication according to the present disclosure may not be performed. On the other hand, the service to be used may use a protocol such as Bluetooth radio frequency communication (RFCOMM) or telephony control protocol (TCS) of the host. In this case, the packet may be received through the secure connection, and accordingly, the encrypted communication according to the present disclosure may be performed. The electronic device 100 may be connected to the external device 200 through the Bluetooth communication method of the BLE version. In this case, whether to perform the encrypted communication for each service may be specified by a generic attribute profile (GATT) of the host.

Therefore, when it is identified that the RSSI information of the encrypted packet such as the RSSI information of the first packet does not exist, the electronic device 100 may transmit the request for performing the encrypted communication to the external device 200 by using a service implemented to receive the packet through the secure connection, thereby causing data communication to acquire the authenticated RSSI. For example, the request for performing the encrypted communication may be transmitted using a read operation through a predefined service such as a service for checking a battery state of the external device 200, and may also be implemented through a separate service, such as a service for transmitting dummy data.

A process of connecting the Bluetooth standard protocol and the Bluetooth communication with each other is described in more detail with reference to FIGS. 5 to 7.

In operation S450, the electronic device 100 may determine whether an encrypted second packet is received. In describing the present disclosure, the term "second packet" may be used for specifying an encrypted packet received in response to the request for performing the encrypted communication as described above, and distinguished from the term "first packet" as described above.

In operation S460, the electronic device 100 may terminate its connection with the external device 200 when the encrypted second packet is not received from the external device 200 despite the request for performing the encrypted communication (S450-N). In detail, the encrypted communication may not be performed despite the request for performing the encrypted communication, and therefore the encrypted second packet may not be received. In this case, the electronic device 100 may determine that an attacker's intervention exists and terminate its communication connection with the external device 200 or provide a user with notification for the security.

In operation S470, the electronic device 100 may perform the authentication for the external device 200 based on the RSSI information of the second packet when the encrypted second packet is received from the external device 200 according to the request for performing the encrypted communication (S450-Y). The electronic device 100 may receive an encrypted second packet from the external device 200 in response to the request for performing the encrypted communication as described above. In detail, the electronic device 100 may acquire the RSSI information of the second packet, and perform the proximity authentication for the external device 200 based on the acquired RSSI information.

That is, the RSSI information of the second packet may be the RSSI information of the encrypted packet acquired through the encrypted communication, and thus be the reliable RSSI information of the packet received from the reliable device. Therefore, the RSSI information of the second packet may also be the authenticated RSSI information like the RSSI information of the first packet, and the electronic device 100 may thus perform the authentication for the external device 200 based on the RSSI information of the second packet.

As in case of the first packet, the first information indicating whether the second packet is encrypted and the second information including the RSSI of the second packet may be correlated with each other and stored in the memory, and then be used for the authentication for the external device 200 when the instruction for acquiring the authenticated RSSI information is executed.

According to another embodiment of the present disclosure, the electronic device 100 may acquire the authenticated RSSI information by requesting the encrypted communication from the external device 200 and receiving the encrypted packet in case that the authenticated RSSI information does not exist when the authenticated RSSI information is required. In addition, it is thus possible to further improve the security of the proximity authentication for the external device 200.

Hereinafter, a process of performing an operation according to the present disclosure under the Bluetooth architecture is described with reference to FIGS. 5 to 8.

Figure 5:
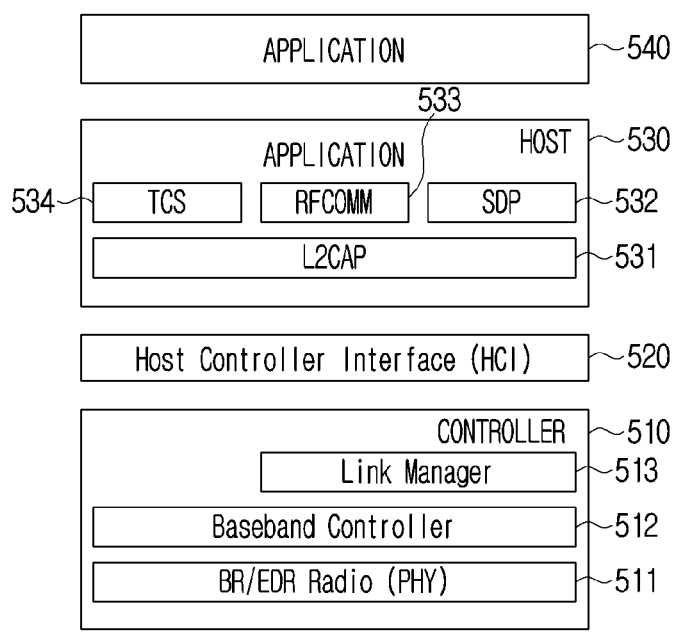
FIG. 5 is a diagram of a Bluetooth architecture according to an embodiment of the disclosure.

FIG. 5 is a diagram of a Bluetooth architecture according to an embodiment of the disclosure. FIG. 6 is a diagram of the Bluetooth architecture according to an embodiment of the disclosure.

Figure 6:
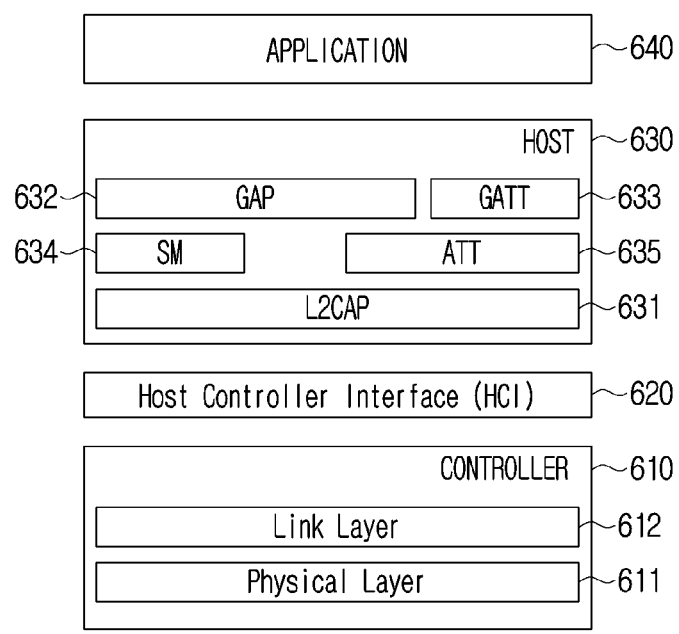
FIG. 6 is a diagram of the Bluetooth architecture according to an embodiment of the disclosure.

In detail, FIGS. 5 and 6 are diagrams respectively showing a protocol stack of the Bluetooth. The protocol stack refers to a set of protocols stacked from a lower layer to an upper layer, and as shown in FIGS. 5 and 6, and may be divided into a controller 510 or 610 and a host 520 or 620 based on a HCI 520 or 620.

Here, the HCI 520 or 620 refers to a standard interface for exchanging the packets between the host 520 or 620 and the controller 510 or 610. In detail, the HCI 520 or 620 may exchange HCI packets such as HCI command, HCI Event, HCI asynchronous ConnectionLess (ACL) data and HCI synchronous connection oriented (SCO) data with each other through a physical bus connected between the host 520 or 620 and the controller 510 or 610.

Functions of the respective protocols included in the controller 510 or 610 and the host 520 or 620 are described in detail below with reference to FIGS. 5 and 6. First, FIG. 5 is a diagram for explaining the Bluetooth architecture of the basic rate (BR) or EDR (enhanced basic rate) version.

A physical layer, that is, a BR/EDR radio 511 may serve to transmit and receive signals (or data) between the electronic device 100 and the external device 200. In addition, the physical layer 511 may perform a digital-analog conversion process, that is, a modulation and demodulation process.

A baseband controller 512 (hereinafter, simply referred to as "baseband") is a protocol corresponding to a link controller of the Bluetooth, and may serve to physically connect the physical layer 511 and the external device 200 with each other and define a logical channel for an interface with the upper layers. In addition, the baseband 512 may serve to perform a connection between the electronic device 100 and the external device 200 and configure a piconet.

A link manager 513 may serve to establish a link between the electronic device 100 and the external device 200. In detail, the link manager 513 may serve to transmit information indicating link setting determined in the baseband 512, connection state setting, and security setting such as a link key or encryption to the external device 200 and receive a response thereto, through a link management protocol (LMP) message.

A logical link control and adaptation protocol (L2CAP) 531 may serve to mediate and arbitrate between an upper layer protocol and a lower layer protocol such as the HCI 520 and the baseband 512. In detail, the L2CAP 531 may serve to perform the mediation when data is transmitted from an upper protocol stack (e.g., SDP 532, Bluetooth RFCOMM 533 or TCS 534), set and manage each data for each logical channel, and deliver the same to the lower layer protocol.

The SDP 532 may perform a process of exchanging information indicating a type of service available in the electronic device 100 or the external device 200 and a characteristic of the service.

The RFCOMM 533 may serve to replace serial transmission such as RS-232C used for connecting a modem with the external device 200. In detail, the RFCOMM 533 may serve to support RS-232C control or a data signal on the baseband for the upper protocol requiring a serial transmission function.

The TCS 534 may serve to charge of call control for interfacing a telephone reply (or a public switched telephone network (PSTN)) or an extension.

FIG. 6 is a diagram of the architecture of the BLE version. A physical layer 611 is not significantly different from that of the BR and EDR versions as described above, and a link layer 612 may also have a function similar to that of the baseband 512 or the link manager 513 as described above. Therefore, a function of the protocol of the host is described below. However, the L2CAP 531 or 631 is described above, and a redundant description is omitted.

A generic access profile (GAP) 632 may serve to define actions and states to be taken by the electronic device 100 or the external device 200 from advertising and scanning phases until the connection is completed and ready for the data communication.

A GATT 633 may serve to abstract a data format and an operation method for data to be exchanged in a consistent manner regardless of which device is connected thereto. The Bluetooth standard defines a profile, and the 'profile' refers to a definition of a type of protocol to be used for each specific function, its structure and how to use the protocol when implementing a Bluetooth function. The GATT 633 may be the basis of the format, hierarchical structure and operation method of data to be equipped when these profiles are implemented in an actual BLE device. In particular, the GATT 633 may specify whether to authenticate/encrypt each service.

A Security Manager (SM) 634 may serve to provide a security algorithm and a protocol for enabling different devices to generate-exchange necessary security keys when performing encrypted secure communication.

Attributes (ATT) 635 may serve to store the concepts and characteristics of the service defined by the GATT 633 in the form of data.

The function of each protocol included in the protocol stack of the Bluetooth is described above. However, this case is only an example, and the Bluetooth architecture according to the present disclosure does not necessarily have to be implemented as shown in FIG. 5 or FIG. 6.

Hereinafter, the connection process of the Bluetooth communication is briefly described with reference to FIG. 7 on the premise of the Bluetooth architecture as described above, and an implementation example according to another embodiment of the present disclosure is described in detail with reference to FIG. 8.

Figure 7:
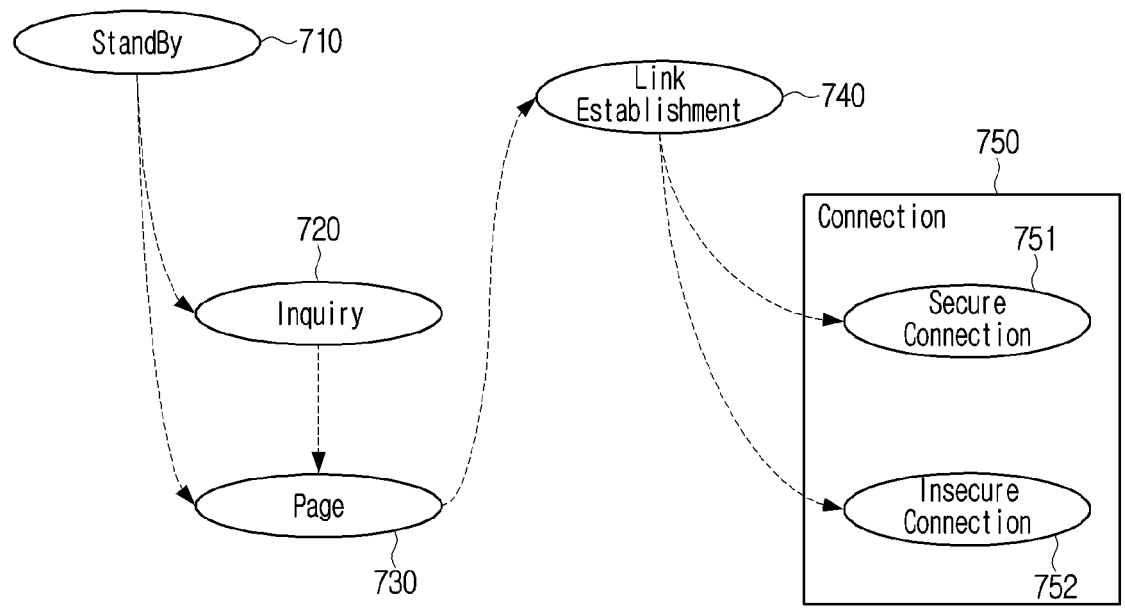
FIG. 7 is a diagram of a connection process of Bluetooth communication according to an embodiment of the disclosure.

FIG. 7 is a diagram of a connection process of Bluetooth communication according to an embodiment of the disclosure.

The electronic device 100 may perform a Bluetooth connection with the external device 200 through a state as shown in FIG. 7. In particular, FIG. 7 depicts the connection process according to security mode 4 of the Bluetooth standard. In detail, the connection process of the Bluetooth communication may proceed in the order of a standby state 710, an inquiry state 720, a page state 730, a link establishment state 740, and a connection state 750.

First, in the standby state 710, the electronic device 100 may enter the inquiry state 720 to search for peripheral devices. The inquiry state 720 may be generally performed only when two devices are connected with each other for the first time. In the inquiry state 720, there may be no setting for hopping between the devices, and it may thus take a long time because broadcasting is performed through several channels. However, one device may be once connected to a specific device, terminate the connection and then attempt to the connection again. In this case, it is possible to perform the page state 730 by directly requesting the connection to the specific device without going through the inquiry state 720, and thus possible to reduce time required in the inquiry state 720.

After the inquiry state 720, the page state 730 may be performed to request the connection to a searched device or the specific device. When a Bluetooth device is found, an actual connection may be performed while a hopping sequence is synchronized with its address and clock information, which may be referred to as paging. Here, hopping refers to a method of dividing and transmitting data while moving between the plurality of channels in a specific order.

The communication may become possible by synchronizing a slave device with a hopping pattern generated by a master device.

After the page state 730, the connection process may proceed through the link establishment phase 740 in which a physical link between the devices is established, and finally reach the connection state 750. However, here, whether the connection is the secure connection or whether the communication is performed through the insecure connection may depend on which protocol or profile the service to be used through the connection uses.

In detail, in case of the BR or EDR version, the SDP may be a protocol for exchanging information indicating available services as described above, and thus, a service using the SDP may perform the communication through the insecure connection. On the other hand, the RFCOMM may be related to the serial communication with the external device 200 as described above and the TCS may be related to the phone call, and a service using the RFCOMM or the TCS may thus perform the communication through the secure connection. As described above, in case of the BLE version, the GATT may individually specify to authenticate/encrypt each service, and the security of the connection may thus depend on whether the authentication/encryption is individually specified by the GATT.

As described above, in the connection process of the Bluetooth communication between the electronic device 100 and the external device 200, the security of their connection may not be guaranteed only by the fact that the physical link is established and the connection is then made. In addition, unless the security of the connection is guaranteed, it is also difficult to consider that RSSI information of the packet received through the connection is the reliable information.

Therefore, in order to acquire the reliable RSSI information, i.e., authenticated RSSI information, it is necessary to confirm that the packet corresponding to the RSSI information is received through the connection that may guarantee its security. In other words, it may be determined that the RSSI information of the packet is reliable when the packet is received through the secure connection based on the encrypted communication, that is, when the received packet is the encrypted packet. Hereinafter, an example for acquiring the authenticated RSSI information depending on whether the received packet is the encrypted packet is described on the premise of the Bluetooth standard as described with reference to FIGS. 5 to 7.

Figure 8:
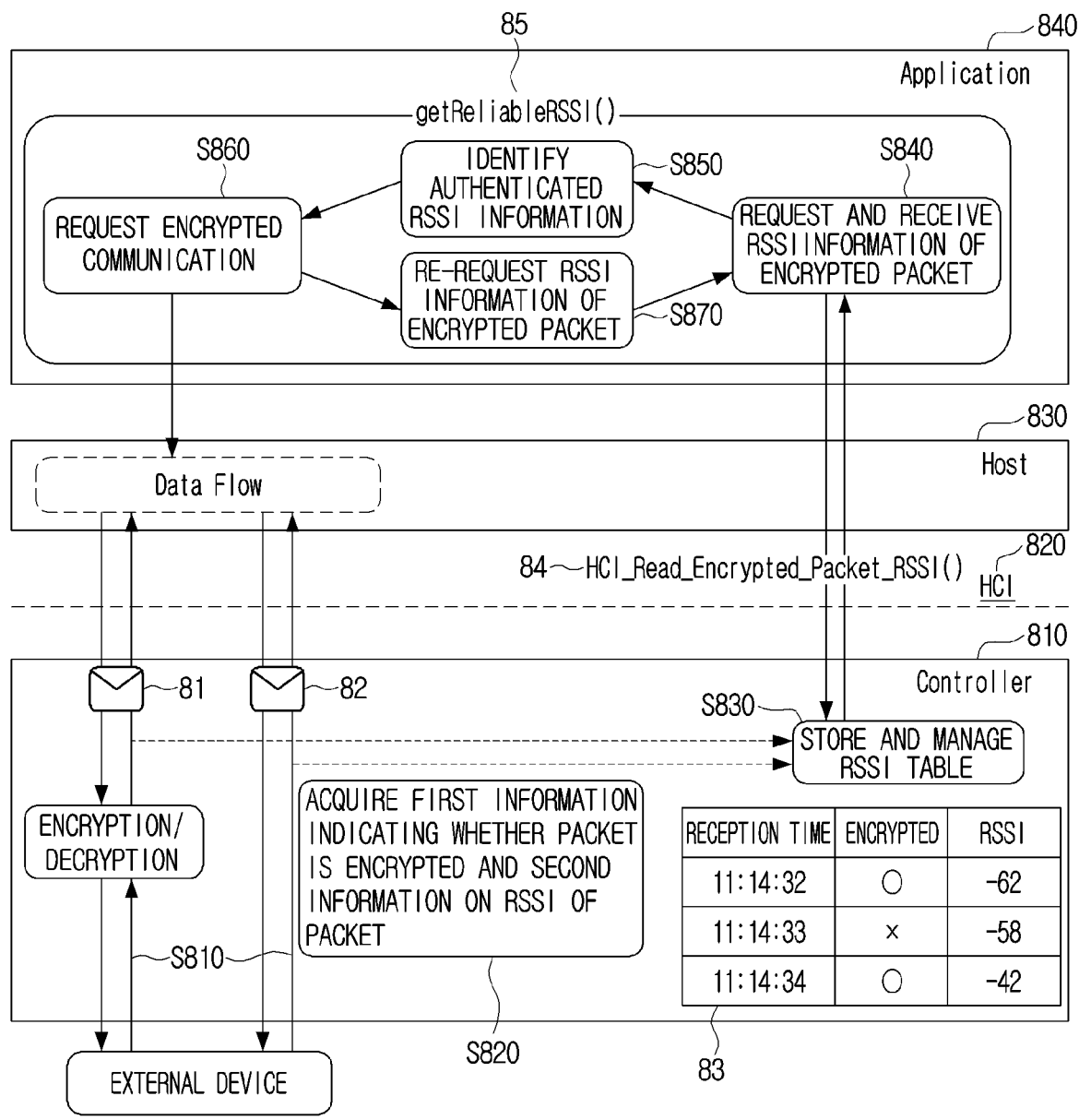
FIG. 8 is a diagram of a control method for an electronic device under the Bluetooth architecture according to an embodiment of the disclosure.

FIG. 8 is a diagram of a control method for an electronic device 100 under the Bluetooth architecture according to an embodiment of the disclosure.

That is, FIG. 8 is a diagram of how various embodiments of the present disclosure as described above with reference to FIGS. 1 to 4 are implemented under the architecture and the connection process of the Bluetooth described with reference to FIGS. 5 to 7. Various examples of the control method for an electronic device according to another embodiment of the present disclosure are described with reference to FIGS. 2 to 4, and a redundant description is thus omitted hereinafter unless the present disclosure is clearly and specifically described.

As shown in FIG. 8, in operation S810, a controller 810 may allow one or more packets to be received from the external device 200. The controller 810 may then identify whether the received one or more packets are encrypted when the one or more packets are received from the external device 200. That is, the one or more packets received from the external device 200 may be packets 81 received through an encryption or decryption process, or may be unencrypted packets 82, as shown in FIG. 8.

In operation S820, the controller 810 may allow the first information indicating whether each of the received one or more packets are encrypted and the second information including the RSSI of each of the received one or more packets to be acquired and stored. In detail, the controller 810 may allow the first information to be acquired by identifying whether each of the received one or more packets are encrypted. The controller 810 may then allow the second information to be acquired by measuring the RSSI of each of the received one or more packets. In detail, the controller 810 may identify whether the received packet is encrypted, allow decryption on the received packet to be performed when the packet is identified as the encrypted packet, and allow the RSSI information to be acquired by measuring a RSSI value of the received packet based on the information acquired through the decryption.

In operation S830, the controller 810 may allow the first and second information corresponding to each packet to be correlated with each other, and stored and managed in the memory of the electronic device 100. In detail, the controller 810 may identify the external device 200 that transmits the one or more packets based on the identification information of the external device 200 such as the MAC address, and may allow the first and second information for each external device 200, corresponding to each packet received from the external device 200, to be stored in the memory. In addition, the controller 810 may allow the third information for the reception time of each packet to be correlated with the first information and the second information and then be stored in the memory.

In particular, the controller 810 may allow the first, second and third information corresponding to each packet for each MAC address to be managed in the form of a table 83 as shown in FIG. 8. Here, allowing the first information and the second information to be managed may include allowing the first information and the second information to be transmitted to the host 830 according to a request of a host 830, controlling how long the first information, the second information and the like are maintained in the memory, etc.

An application 840 may acquire the authenticated RSSI information through a process described below. Here, the application 840 may not only be an application downloaded and installed in the electronic device 100, but also be a library or a specific module in the operating system that provides a Bluetooth-related function in an operating system for the electronic device 100. In addition, some or all of the functions of the application 840 may be implemented in the host 830.

A process in which the application 840 acquires the authenticated RSSI information may be defined through a function that may be referred to as a so-called getReliableRSSI( ) 85, as shown in FIG. 8. Hereinafter, each process of acquiring the authenticated RSSI information is described.

In operation S840, the application 840 may request the RSSI information of the encrypted packet from the controller 810 when the instruction for acquiring the authenticated RSSI information is executed, and receive the RSSI information of the encrypted packet by a response of the controller 810. In detail, the controller 810 may identify the RSSI information of the encrypted packet based on the first information and the second information as described above when the application 840 requests the RSSI information of the encrypted packet from the controller 810 through the host 830, and allow the identified RSSI information to be transmitted to the application 840 through the host 830.

The processes of requesting and receiving the authenticated RSSI information may be implemented through a function (or method) of a HCI 820 requesting the RSSI information of the encrypted packet. For example, the function of the HCI 820 for requesting the RSSI information of the encrypted packet from the controller may be named as HCI_ReadEncrypted_Packet_RSSI( ) 84 as shown in FIG. 8. HCI_ReadEncrypted_Packet_RSSI( ) 84 may include an input parameter including connection handle for making a logical connection with the external device 200, and a response parameter including state information indicating whether to authenticate and the RSSI value. Here, the state information indicating whether to authenticate may depend on whether the packet is encrypted.

In operation S850, the application 840 may identify the authenticated RSSI information. In addition, the application 840 may perform the authentication for the external device 200 based on the authenticated RSSI information when the authenticated RSSI information is identified. In detail, the application 840 may identify the RSSI information of the encrypted packet as the authenticated RSSI information when the RSSI information of the encrypted packet is received under control of the controller 810, and perform the proximity authentication for the external device 200 based on the authenticated RSSI information.

The process of requesting the RSSI information of the encrypted packet and the process of identifying the authenticated RSSI information may be performed by targeting only the packets received from the external device 200 in the predetermined period. In detail, the application 840 may request the RSSI information of only the packet received from the external device 200 in the predetermined period from the controller 810. In addition, the application 840 may identify the authenticated RSSI information by targeting only the RSSI information of the packet received from the external device 200 in the predetermined period among the RSSI information received under the control of the controller 810.

In operation S860, the application 840 may transmit the request for performing the encrypted communication to the external device 200 when it is identified that the authenticated RSSI information does not exist as a result of identifying the authenticated RSSI information as described above.

As described above, the "encrypted communication" according to the present disclosure may refer to the communication enabling the encrypted packet to be received through the secure connection. That is, whether the connection is the secure connection or whether the communication is performed through the insecure connection may depend on which protocol or profile the service to be used through the connection uses.

For example, in case of the BR or EDR version, the SDP may be the protocol for exchanging the information indicating the available services as described above, and thus, the service using the SDP may perform the communication through the insecure connection. On the other hand, the RFCOMM may be related to the serial communication with the external device 200 as described above and the TCS may be related to the phone call, and the service using the RFCOMM or the TCS may thus perform the communication through the secure connection. As described above, in case of the BLE version, the GATT may individually specify whether to perform authentication/encryption for each service, and the security of the connection may thus depend on whether the authentication/encryption is individually specified by the GATT.

Therefore, when it is identified that the authenticated RSSI information does not exist as a result of identifying the authenticated RSSI information as described above, the electronic device 100 may transmit the request for performing the encrypted communication to the external device 200 by using the service implemented to receive the packet through the secure connection, thereby causing the data communication to acquire the authenticated RSSI. For example, the request for performing the encrypted communication may be transmitted using the read operation through the predefined service such as the service for checking the battery state of the external device 200, and may also be implemented through the separate service, such as the service for transmitting the dummy data.

The application 840 may terminate its connection with the external device 200 or provide the user with the notification for the security when the encrypted packet is not received from the external device 200 despite the request for performing the encrypted communication. On the other hand, the controller 810 may allow the encrypted packet to be received from the external device 200 in response to the request for performing the encrypted communication as described above.

The application 840 may re-request the RSSI information of the encrypted packet from the controller 810 when the encrypted packet is received from the external device 200 according to the request for performing the encrypted communication, and receive the RSSI information of the encrypted packet according to the response provided under the control of the controller 810 (S870). Here, the authenticated RSSI information may indicate the RSSI information of the encrypted packet acquired through the encrypted communication, and may thus be used for the authentication for the external device 200.

Above is an example in which the controller 810 may identify the RSSI information of the encrypted packet based on the first information and the second information when the application 840 requests the RSSI information of the encrypted packet from the controller 810 through the host 830, and allow the identified RSSI information to be transmitted to the application 840 through the host 830. However, the present disclosure is not limited thereto. That is, according to another example, the application 840 may receive the RSSI information of both the encrypted packet and a non-encrypted packet from the controller 810 through the host 830, and acquire the authenticated RSSI information by identifying the RSSI information of the encrypted packet.

The description above describes the protocol and the profile which may be used for the encrypted communication on the premise of the BR, EDR and BLE versions of the Bluetooth standard. However, the present disclosure is not limited to a specific version of the standard. That is, any communication method which may receive the encrypted packet through the secure connection may correspond to the encrypted communication according to the present disclosure.

The description above does not specify a case where the authenticated RSSI information is for the plurality of packets. However, various examples according to the present disclosure may be used as a method for acquiring the authenticated RSSI information of the plurality of packets. In addition, the security of the authentication may be further increased when the proximity authentication for the external device is performed using the authenticated RSSI information of the plurality of packets.

Figure 9:
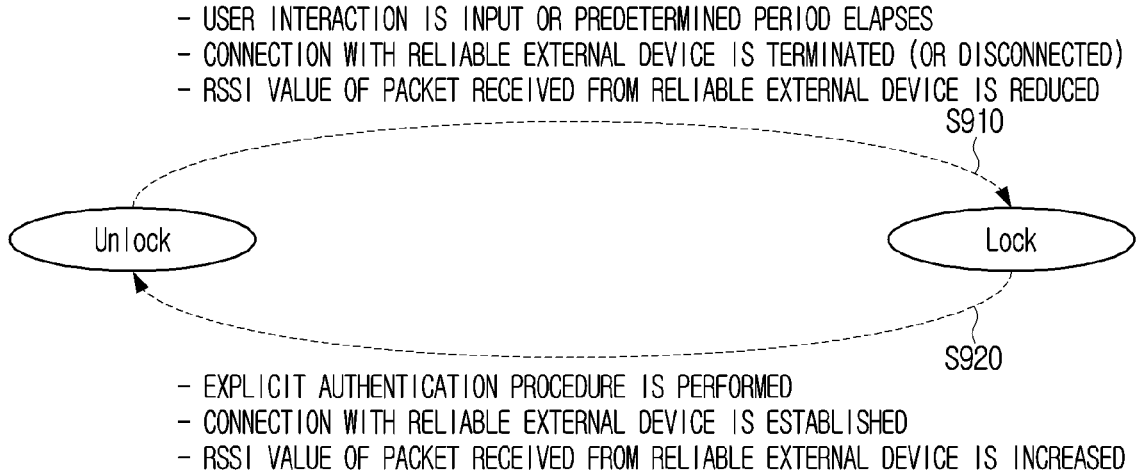
FIG. 9 is a diagram of methods of locking and unlocking the electronic device according to an embodiment of the disclosure.

FIG. 9 is a diagram of methods of locking and unlocking the electronic device 100 according to an embodiment of the disclosure.

As shown in FIG. 9, the electronic device 100 may be locked or unlocked when one or more predetermined conditions are satisfied. Here, the term "lock" may be used as a general term for a method for restricting a user access to at least some of the operations of the electronic device 100. Here, the term "unlock" may be used as a general term for a method for allowing a user access to at least some of the operations of the electronic device 100

In detail, in operation S910, the electronic device 100 may be locked when one or more of the following conditions are satisfied: (1) when a user interaction is input thereto, when the predetermined period elapses, (2) when its connection with the reliable external device 200 is terminated (or disconnected), and (3) when the RSSI value of the packet received from the reliable external device 200 is reduced.

In operation S920, the electronic device 100 may be unlocked when one or more of the following conditions are satisfied: (1) when an explicit authentication procedure is performed, (2) when the electronic device is connected with the reliable external device 200, and (3) when the RSSI value of the packet received from the reliable external device 200 is increased.

In the above, a significant security problem may not occur when the electronic device 100 is locked by the user interaction or the elapse of the predetermined period, or when the electronic device 100 is unlocked by performing the explicit authentication procedure.

However, the electronic device 100 may be locked or unlocked based on its connection with the reliable external device 200. In this case, the security problem may occur in that the external device 200 cannot be reliable just because the connection as described above is made. In addition, the electronic device 100 may be locked or unlocked based on the RSSI value of the packet received from the reliable external device 200. In this case, the reliability of the RSSI value is required to be guaranteed.

Accordingly, according to the various embodiments of the present disclosure as described above, the electronic device 100 may ensure the security by acquiring the reliable RSSI information, i.e., authenticated RSSI information, and performing the proximity authentication for the external device 200 based on the authenticated RSSI information, and being locked and unlocked based on the result of the proximity authentication.

In detail, the electronic device 100 may acquire the information indicating the distance between the electronic device 100 and the external device 200 based on the authenticated RSSI information when the authenticated RSSI information is acquired as described above. That is, the electronic device 100 may acquire the information indicating the distance between the electronic device 100 and the external device 200 by using the principle that the signal transmitted from the external device 200 has the decreased strength and then received by the electronic device 100 as the distance between the electronic device 100 and the external device 200 is increased when the authenticated RSSI information is acquired.

In more detail, the distance between the electronic device 100 and the external device 200 may be measured using Equation (1):

$$\text{RSSI} = -10n \log d + \text{TxPower} \quad (1)$$

where, as in Equation (2).

$$d = 10^{(\text{TxPower}-\text{RSSI})(10n)} \quad (2)$$

Here, "d" indicates the distance between the electronic device 100 and the external device 200, TxPower indicates the strength of a signal transmitted from the external device 200, and RSSI indicates the RSSI value of the packet received from the external device 200. "n" indicates a correction constant depending on presence of an obstacle existing between the electronic device 100 and the external device 200, for example, n=2 when there is no obstacle.

When the information indicating the distance between the electronic device 100 and the external device 200 is acquired, the electronic device 100 may perform the proximity authentication for the external device 200 based on the information indicating the distance between the electronic device 100 and the external device 200. In detail, the electronic device 100 may be unlocked when it is identified that the external device 200 is positioned within a predetermined distance from the electronic device 100 based on the information indicating the distance between the electronic device 100 and the external device 200. The electronic device 100 may be locked when it is identified that the external device 200 is positioned beyond the predetermined distance from the electronic device 100 based on the information indicating the distance between the electronic device 100 and the external device 200.

The description above describes the method of performing the proximity authentication for the external device based on the authenticated RSSI information with reference to FIG. 9. However, the authenticated RSSI information according to the present disclosure may be used in various ways as a method for acquiring the information indicating the position of the external device. In other words, a characteristic of present disclosure may lie in the method itself for acquiring the reliable RSSI information, and how to utilize the acquired RSSI information may depend on various embodiments of present disclosure.

Figure 10:
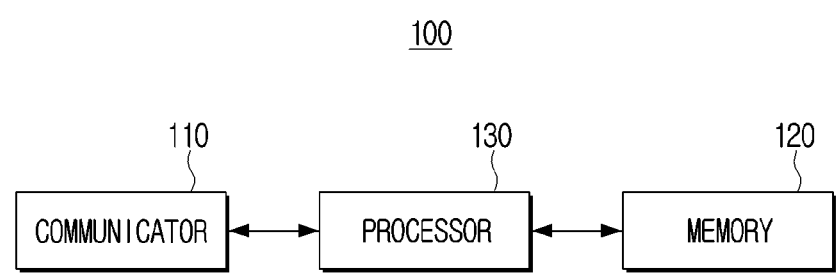
FIG. 10 is a diagram of a configuration of the electronic device according to an embodiment of the disclosure.
Figure 11:
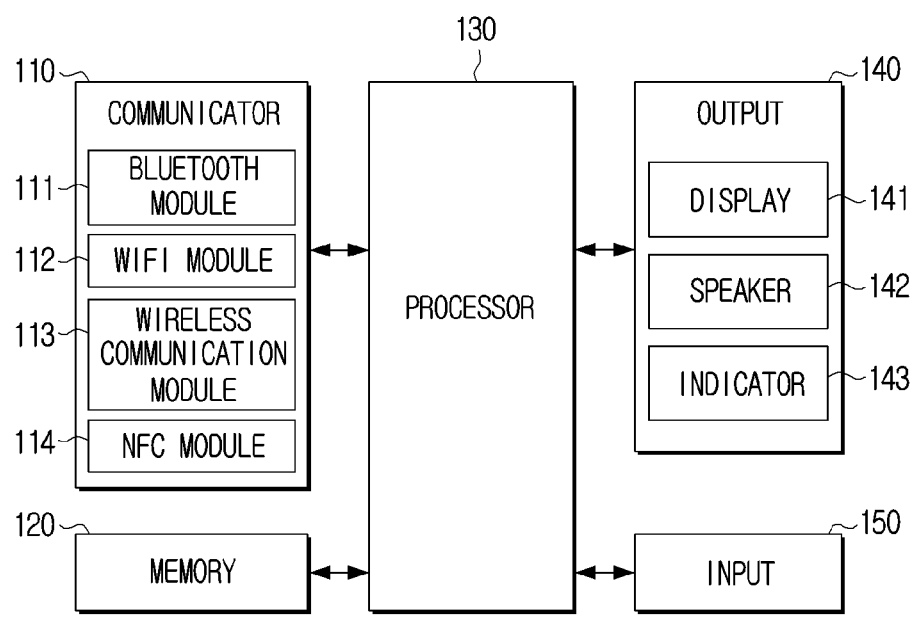
FIG. 11 is a diagram of a configuration of the electronic device according to an embodiment of the disclosure.

FIG. 10 is a diagram of a configuration of the electronic device 100 according to an embodiment of the disclosure. FIG. 11 is a diagram of the configuration of the electronic device 100 according to an embodiment of the disclosure.

Referring to FIG. 10, the electronic device 100 according to an embodiment of the present disclosure may include a communicator 110, a memory 120 and a processor 130. In addition, as shown in FIG. 11, the electronic device 100 according to an embodiment of the present disclosure may further include an output 140 and an input 150. However, this configuration is an example, and a new configuration may be added or some configuration may be omitted in addition to this configuration when the present disclosure is performed.

The communicator 110 may include a circuit and may perform communication with a server or the external device 200. In detail, the processor 130 may allow various data or information to be received from the server or the external device 200, connected through the communicator 110, and allow the various data or information to be transmitted to the server or the external device 200.

The communicator 110 may include at least one of a Bluetooth module 111, a WiFi module 112, a wireless communication module 113 or a near field communication (NFC) module 114. In detail, the Bluetooth module 111 and the WiFi module 112 may respectively perform the communication in a Bluetooth method and a WiFi method. In case of using the Bluetooth module 111 or the WiFi module 112, various connection information such as a service set identifier (SSID) may be first transmitted and received, the communication connection may be established using this connection information, and various types of information may then be transmitted and received. A detailed description of the Bluetooth module 111 is replaced with the description of the Bluetooth architecture and the connection process of the Bluetooth communication described with reference to FIGS. 5 to 7.

In addition, the wireless communication module 113 may perform the communication according to various communication standards such as IEEE, Zigbee, 3rd Generation (3G), 3rd generation partnership project (3GPP), long term evolution (LTE), 5th Generation (5G), etc. In addition, the NFC module 114 may perform the communication by using an NFC method that uses a 13.56 MHz band among various radio frequency identification (RF-ID) frequency bands such as 135 kHz, 13.56 MHz, 433 MHz, 860 to 960 MHz, 2.45 GHz, etc.

In particular, in the various embodiments according to the present disclosure, the communicator 110 may receive one or more packets from the external device 200. In addition, the processor 130 may control the communicator 110 to transmit the one or more packets to the external device 200. The electronic device 100 according to the present disclosure may be connected to the external device 200 through the Bluetooth communication method.

The memory 120 may store at least one instruction related to the electronic device 100. In addition, the memory 120 may store the operating system (O/S) for driving the electronic device 100. In addition, the memory 120 may store various software programs or applications for operating the electronic device 100 according to the various embodiments of the present disclosure. In addition, the memory 120 may include a semiconductor memory such as a flash memory, or a magnetic storing medium such as a hard disk, or the like.

In detail, the memory 120 may store various software modules for operating the electronic device 100 according to the various embodiments of the present disclosure, and the processor 130 may allow the various software modules stored in the memory 120 to be executed to control the operation of the electronic device 100. That is, the memory 120 may be accessed by the processor 130, and readout, recording, correction, deletion, update and the like of data may be performed by the processor 130.

In the present disclosure, the term "memory" may include the memory 120, a read only memory (ROM) or a random access memory (RAM) in the processor 130, or a memory card mounted on the electronic device 100 (e.g., micro secure digital (SD) card or memory stick).

In particular, in the various embodiments according to the present disclosure, the memory 120 may store the first information indicating whether each of one or more packets received from the external device 200 is encrypted, the second information including the RSSI of each packet, and the third information indicating the reception time of each packet. In addition, the memory 120 may store various information necessary within a scope to achieve the purpose of the present disclosure, and the information stored in the memory 120 may be received from the server or the external device 200, or input by the user to be updated.

The processor 130 may control an overall operation of the electronic device 100. In detail, the processor 130 may be connected to the components of the electronic device 100 such as the communicator and the memory 120 as described above, and control the overall operation of the electronic device 100 by allowing at least one instruction stored in the memory 120 to be executed as described above.

The processor 130 may be implemented in various schemes. For example, the processor 130 may be implemented as at least one of an application specific integrated circuit (ASIC), an embedded processor, a microprocessor, a hardware control logic, a hardware finite state machine (FSM) or a digital signal processor (DSP). In the present disclosure, the term the "processor" may be used to include a central processing unit (CPU), a graphic processing unit (GPU), a main processing unit (MPU) or the like.

In particular, in the various embodiments according to the present disclosure, the processor 130 may identify whether one or more packets are encrypted when the one or more packets are received from the external device 200 connected to the electronic device 100, allow the first information indicating whether each of the one or more packets is encrypted and the second information including the RSSI of each of the one or more packets to be acquired, and identify the RSSI information of an encrypted first packet based on the first information and the second information when an instruction for acquiring the authenticated RSSI information of the external device 200 is executed. The various embodiments according to the present disclosure are described above with reference to FIGS. 1 through 9, and a redundant description is thus omitted.

The output 140 may include a circuit, and the processor 130 may allow various functions that the electronic device 100 may perform to be output by the output 140. In addition, the output 140 may include at least one of a display 141, a speaker or an indicator.

The display 141 may output image data under control of the processor 130. In detail, the display 141 may output an image pre-stored in the memory 120 under the control of the processor 130. In particular, the display 141 according to an embodiment of the present disclosure may display a user interface stored in the memory 120. The display 141 may be implemented as a liquid crystal display panel (LCD), an organic light emitting diode (OLED) or the like, and the display 141 may be implemented as a flexible display, a transparent display or the like in some cases. However, the display according to the present disclosure is not limited to a specific type. A speaker 142 may output audio data under the control of the processor 130, and an indicator 143 may be lit under the control of the processor 130.

In particular, in the various embodiments according to the present disclosure, the output 140 may output a user notification for the connection process of the electronic device 100 with the external device 200 and the data transmission/reception. In addition, the processor 130 may determine that an attacker's intervention exists and allow the user notification for the security to be provided by the output 140 when the encrypted packet is not received from the external device 200 despite the request for performing the encrypted communication. Here, the user notification may be provided visually through the display 141 or the indicator 143, or may be provided aurally through the speaker 142. In addition, the processor 130 may also allow the user interface for receiving a user command on whether to terminate the communication connection of the electronic device 100 with the external device 200 and the user notification for the security to be provided by the output 140.

The input 150 may include a circuit, and the processor 130 may allow the user command for controlling the operation of the electronic device 100 to be received by the input 150. In detail, the input 150 may include a component such as a microphone, a camera or a remote control signal receiver. In addition, the input 150 may be implemented as a touch screen included in the display 141.

In particular, in the various embodiments according to the present disclosure, the input 150 may receive the user command for establishing the communication connection with the external device 200 or terminating the communication connection with the external device 200.

According to the various embodiments of the present disclosure as described above, the electronic device 100 may store the RSSI information of the encrypted packet among the packets received from the external device 200 as the authenticated RSSI information, and perform the proximity authentication for the external device 200 based on the authenticated RSSI information when the authenticated RSSI information is required. In addition, the electronic device 100 may perform the proximity authentication for the external device 200 in consideration of only the RSSI information of the packet received within the period to guarantee the reliability based on the time when the instruction for acquiring the RSSI information is executed. Accordingly, the electronic device 100 may perform the high-security proximity authentication even when the position of at least one of the electronic device 100 and the external device 200 is changed. Furthermore, the electronic device 100 may acquire the authenticated RSSI information by requesting the encrypted communication from the external device 200 and receiving the encrypted packet in case that the authenticated RSSI information does not exist when the authenticated RSSI information is required. In addition, it is thus possible to further improve the security of the proximity authentication for the external device 200.

Each of components (for example, modules or programs) according to the various embodiments of the present disclosure described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner.

Operations performed by the modules, the programs, or other components according to the various embodiments may be executed in a sequential manner, a parallel manner, an iterative manner or a heuristic manner, at least some of the operations may be performed in a different order or be omitted, or other operations may be added.

The term "part" or "module" used in the present disclosure may include a unit including hardware, software or firmware, and may be used interchangeably with the term, for example, a logic, a logic block, a component or a circuit. The "part" or "module" may be an integrally formed component or a minimum unit or part performing one or more functions. For example, the module may include an ASIC.

The various embodiments of the present disclosure may be implemented by software including an instruction stored in a machine-readable storage medium (for example, a computer-readable storage medium). A machine may be an apparatus that invokes the stored instruction from the storage medium, may be operated based on the invoked instruction, and may include the electronic device (for example, electronic device 100) according to the disclosed embodiments.

In case that the instruction is executed by the processor, the processor may directly perform a function corresponding to the instruction or allow other components to perform the function corresponding to the instruction. The instruction may include codes provided or executed by a compiler or an interpreter.

The machine-readable storage medium may be provided in the form of a non-transitory storage medium. Here, the "non-transitory storage medium" is a tangible device and may only indicate that this storage medium does not include a signal (e.g., electromagnetic wave), and this term does not distinguish a case where data is stored semi-permanently in the storage medium and a case where data is temporarily stored in the storage medium from each other. For example, the "non-transitory storage medium" may include a buffer in which data is temporarily stored.

According to another embodiment, the method according to the various examples disclosed in the present disclosure may be included and provided in a computer program product. The computer program product may be traded as a product between a seller and a purchaser. The computer program product may be distributed in a form of a storage medium (for example, a compact disc read only memory (CD-ROM)) that may be read by the machine, or may be distributed online (for example, downloaded or uploaded) through an application store (for example, PlayStore™) or directly between two user devices (for example, smartphones). In case of the online distribution, at least a portion of the computer program product may be at least temporarily stored in a machine-readable storage medium such as a memory of a server of a manufacturer, a server of an application store or a relay server, or be temporarily provided.

Although the disclosure been described in connection with some embodiments illustrated in the accompanying drawings, it will be understood by one of ordinary skill in the art that variations in form and detail may be made therein without departing from the spirit and essential feature of the disclosure. The above disclosed embodiments should thus be considered illustrative and not restrictive.

What is claimed is:

1. An electronic device comprising:
    memory storing instructions; and
    a processor,
    wherein the instructions, when executed by the processor, cause the electronic device to:
        based on receiving one or more packets from an external device, identify whether the one or more packets are encrypted,
        acquire first information indicating whether each of the one or more packets is encrypted and second information including a received signal strength indicator (RSSI) of each of the one or more packets,
        correlate the first information and the second information corresponding to each of the one or more packets with each other, and
        acquire authenticated RSSI information of the external device by:
            identifying an encrypted first packet among the one or more packets based on the first information, and
            identifying RSSI information of the encrypted first packet based on the second information of the encrypted first packet that is correlated with the first information of the encrypted first packet.

2. The electronic device of claim 1, wherein the instructions, when executed by the processor, cause the electronic device to:
    acquire third information indicating a reception time of each of the one or more packets, identify the one or more packets received from the external device for a predetermined period based on the third information, and identify the RSSI information of the encrypted first packet among the one or more packets identified as being received in the predetermined period based on the first information and the second information.

3. The electronic device of claim 2, wherein the predetermined period is a period from a first time before a predetermined time interval to a second time, and wherein the second time is a time when the acquiring the authenticated RSSI information begins.

4. The electronic device of claim 1, wherein the instructions, when executed by the processor, cause the electronic device to:

based on the RSSI information of the encrypted first packet not being identified, transmit a request for performing encrypted communication to the external device; and based on receiving an encrypted second packet from the external device, acquire RSSI information of a second packet.

5. The electronic device of claim 4, wherein the instructions, when executed by the processor, cause the electronic device to terminate connection of the electronic device with the external device based on the second packet not being received from the external device.

6. The electronic device of claim 4, wherein the instructions, when executed by the processor, cause the electronic device to:

acquire information indicating a distance between the electronic device and the external device based on the RSSI information of the encrypted first packet or the RSSI information of the encrypted second packet; and perform proximity authentication for the external device based on the information indicating the distance between the electronic device and the external device.

7. The electronic device of claim 6, wherein the instructions, when executed by the processor, cause the electronic device to:

based on identifying that the external device is positioned within a predetermined distance from the electronic device based on the information indicating the distance between the electronic device and the external device, unlock the electronic device.

8. A control method for an electronic device, the control method comprising:

based on receiving one or more packets from an external device, identifying whether the one or more packets are encrypted;

acquiring first information indicating whether each of the one or more packets is encrypted and second information including a received signal strength indicator (RSSI) of each of the one or more packets;

correlating the first information and the second information corresponding to each of the one or more packets with each other; and acquiring authenticated RSSI information of the external device by:

identifying an encrypted first packet among the one or more packets based on the first information, and identifying RSSI information of the encrypted first packet based on the second information of the encrypted first packet that is correlated with the first information of the encrypted first packet.

9. The control method of claim 8, further comprising acquiring third information indicating reception time of each of the one or more packets, wherein the identifying of the RSSI information of the encrypted first packet comprises:

identifying the one or more packets received from the external device in a predetermined period based on the third information, and identifying the RSSI information of the encrypted first packet among the one or more packets identified as being received for the predetermined period based on the first information and the second information.

10. The control method of claim 9, wherein the predetermined period is a period from a first time before a predetermined time interval to second time, and wherein the second time is a time when the acquiring the authenticated RSSI information begins.

11. The control method of claim 8, further comprising:

based on the RSSI information of the encrypted first packet not being identified, transmitting a request for performing encrypted communication to the external device; and based on receiving an encrypted second packet from the external device, acquiring RSSI information of a second packet.

12. The control method of claim 11, further comprising terminating connection of the electronic device with the external device based on the second packet not being received from the external device.

13. The control method of claim 11, further comprising:

acquiring information indicating a distance between the electronic device and the external device based on the RSSI information of the encrypted first packet or the RSSI information of the encrypted second packet; and performing proximity authentication for the external device based on the information indicating the distance between the electronic device and the external device.

14. The control method of claim 13, further comprising:

based on identifying that the external device is positioned within a predetermined distance from the electronic device based on the information indicating the distance between the electronic device and the external device, unlocking the electronic device; and based on identifying that the external device is positioned beyond the predetermined distance from the electronic device based on the information indicating the distance between the electronic device and the external device, locking the electronic device.

15. A non-transitory computer-readable recording medium storing instructions that, when executed by at least one processor of an electronic device, cause the at least one processor to:

based on receiving one or more packets from an external device, identify whether the one or more packets are encrypted;

acquire first information indicating whether each of the one or more packets is encrypted and second information including a received signal strength indicator (RSSI) of each of the one or more packets;

correlate the first information and the second information corresponding to each of the one or more packets with each other; and acquire authenticated RSSI information of the external device by:

identifying an encrypted first packet among the one or more packets based on the first information; and identifying RSSI information of the encrypted first packet based on the second information of the encrypted first packet that is correlated with the first information of the encrypted first packet.

16. The recording medium of claim 15, wherein the instructions, when executed, further cause the at least one processor to:
   acquire third information indicating a reception time of each of the one or more packets,
   identify the one or more packets received from the external device for a predetermined period based on the third information, and
   identify the RSSI information of the encrypted first packet among the one or more packets identified as being received for the predetermined period based on the first information and the second information.

17. The recording medium of claim 16, wherein the predetermined period is a period from a first time before a predetermined time interval to a second time, and
   wherein the second time is a time when the acquiring the authenticated RSSI information begins.

18. The recording medium of claim 15, wherein the instructions, when executed, further cause the at least one processor to:
   based on the RSSI information of the encrypted first packet not being identified, transmit a request for performing encrypted communication to the external device; and
   based on receiving an encrypted second packet from the external device, acquire RSSI information of a second packet.

19. The recording medium of claim 18, wherein the instructions, when executed, further cause the at least one processor to terminate connection of the electronic device with the external device based on the second packet not being received from the external device.

20. The recording medium of claim 18, wherein the instructions, when executed, further cause the at least one processor to:
   acquire information indicating a distance between the electronic device and the external device based on the RSSI information of the encrypted first packet or the RSSI information of the encrypted second packet; and
   perform proximity authentication for the external device based on the information indicating the distance between the electronic device and the external device.

* * * * *